US008642156B2

(12) United States Patent
Jessee, III

(10) Patent No.: US 8,642,156 B2
(45) Date of Patent: Feb. 4, 2014

(54) SYSTEM AND METHOD FOR FORMING A SUPPORT ARTICLE

(76) Inventor: Edgar Forrest Jessee, III, New York, NY (US)

( * ) Notice: Subject to any disclaimer, the term of this patent is extended or adjusted under 35 U.S.C. 154(b) by 503 days.

(21) Appl. No.: 12/940,617

(22) Filed: Nov. 5, 2010

(65) Prior Publication Data

US 2012/0114900 A1 May 10, 2012

(51) Int. Cl.
*B32B 3/30* (2006.01)

(52) U.S. Cl.
USPC .............. 428/73; 493/397; 493/404; 428/116

(58) Field of Classification Search
USPC ............. 493/966, 397, 404; 428/73, 116, 118
See application file for complete search history.

(56) References Cited

U.S. PATENT DOCUMENTS

| | | | | |
|---|---|---|---|---|
| 2,674,295 | A * | 4/1954 | Steele et al. | 156/197 |
| 2,828,235 | A * | 3/1958 | Holland et al. | 428/118 |
| 3,556,917 | A * | 1/1971 | Eakin et al. | 428/71 |
| 3,996,087 | A * | 12/1976 | May et al. | 156/197 |
| 4,008,651 | A * | 2/1977 | Pain | 493/277 |
| 5,593,755 | A * | 1/1997 | Fuss | 428/134 |
| 5,709,771 | A * | 1/1998 | Fritzman | 156/474 |
| 6,183,836 | B1 | 2/2001 | Pflug | |
| 6,395,372 | B1 * | 5/2002 | Bach | 428/137 |
| 6,527,895 | B1 * | 3/2003 | Palmer | 156/197 |
| 2006/0105135 | A1 * | 5/2006 | Chien et al. | 428/73 |
| 2011/0098170 | A1 * | 4/2011 | Le Monnier | 493/394 |
| 2011/0244177 | A1 * | 10/2011 | Nasstrom | 428/116 |
| 2012/0065757 | A1 * | 3/2012 | Tepe et al. | 700/98 |

OTHER PUBLICATIONS

Treehugger, Online Forum, Jan. 15, 2010 [Retrieved on Nov. 3, 2010] Retrieved from the Internet : <URL:http://www.treehugger.com/files/2010/01/sleep-anywhere-in-sleepsuit.php.

Penny'S Daybook, Online Forum, Jan. 14, 2010 [Retrieved on Nov. 3, 2010] Retrieved from the Internet : <URL:http://www.pennysdaybook.com/2010/01/sleep-suit-up/.

likecool.com., Online Forum, Jan. 13, 2010 [Retrieved on Nov. 3, 2010] Retrieved from the Internet : <URL:http://likecool.com/Sleep_Suit--Projects--Gear.html.

Pleat Farm, Online Forum, Nov. 16, 2009 [Retrieved on Nov. 3, 2010] Retrieved from the Internet <URL:http://www.pleatfarm.com/2009/11/16/sleep-suit-by-forrest-jessee/.

Surface Magazine, Issue 79, Thesis Guide, Nov. 5, 2009 [Retrieved on Nov. 3, 2010] Retrieved from the Internet <URL:http://www.surfacemag.com/thesisguide/page/2/.

* cited by examiner

*Primary Examiner* — Hemant M Desai

(74) *Attorney, Agent, or Firm* — Keith D. Nowak; Libby B. Varghese; Carter Ledyard & Milburn LLP

(57) ABSTRACT

A collapsible support article having a bi-directional corrugated structure is defined by folding along folds lines in an accordion style resulting in peak and valley rows with first and second connections points being defined along the folds lines to generate a second direction of the structure. The first connection points are connected at each peak or valley and each second connection point is connected to adjacent peak or valley rows to define the structural unit. The material used as well as spacing between connection points and the distance between the fold lines determine the strength of and the visibility through the structural unit. The structural unit may be used as a single unit for packing material, as a travel pillow or a plurality of joined structural units to define a sleep suit. Variations in the structural unit may result in a curved support article or a contoured support article.

9 Claims, 4 Drawing Sheets

SYSTEM AND METHOD FOR FORMING A SUPPORT ARTICLE

PRIORITY AND RELATED APPLICATION

N/A

FIELD OF THE INVENTION

The present invention relates to support and protection devices, more specifically to an easily transformable support device that can be used to support a variety of objects including humans, or products in one position and can be collapsed and stowed away in a second position.

BACKGROUND OF THE INVENTION

Articles designed for support, protection or comfort may be realized in a variety of forms. For instance lightweight structural materials, such as the honeycomb, are designed with orthogonal relationships between the x and y planes and the z plane in its members. Other support, protection or comfort articles may be collapsible or flat-packed materials that also use orthogonal relationships between the members. These honeycomb, collapsible or flat-packed materials often require a second material to achieve structural rigidity such as exterior panels to sandwich a honeycomb core fixed between the panels or as an infill material that holds the honeycomb in place. Many other prior art honeycomb materials are often cut as strips and attached to each other with a binding agent. Alternatively, they can be cut and assembled with simple halved joints in some applications or created by removing material from a solid piece.

A simple space frame truss commonly used in engineering applications is able to accommodate long spans and/or structural support for heavy loads. The structural advantage of the space frame is that it derives its strength from the inherent rigidity of the triangular frame. Flexing loads (bending moments) are transmitted as tension and compression loads along the length of each strut. The simplest space frame is a series of interlocking square pyramids and provides the basis for the structural system of the designed material.

Thus a support, protection, or comfort article is desired that includes a method of assembling a support article from a single sheet or strips of material, with the potential for no waste. A support article is also desired to have a design of the material that incorporates the properties of a honeycomb structure with the structural efficiency of triangulation. The triangle is one of the strongest shapes known and is the most ideal shape for structural efficiency and by employing the triangle as the basic shape in the desired support article, the material can offer strong and rigid structural and support solutions by virtue of the triangle's structural efficiency.

A support article is further desired to have the potential to exist on its own without the need for a second material for structural support. With a unitary design, the product allows for efficiency in production. A unitary article may be realized by cutting and assembling the article from a single sheet of material thus offering advantages in manufacturing of the article.

BRIEF SUMMARY OF THE INVENTION

A collapsible and easy to assemble support article is defined by pleating or folding in an accordion-style a sheet of material to define rows of peaks and valleys. Each row has a number of first and second points that alternate along the respective row; first peak points alternate with second peak points along the peak row and first valley points alternate with second valley points along the valley row. The first peak points align with the first valley points to define a first column and second peak points align with second valley points to define a second column. Each first column alternates with each second column and in some embodiments, while in other embodiments the columns are vertical to the rows. The peak row at each second peak point is split into a primary peak side and a secondary peak side and the valley row at each second valley point is split into a primary valley side and a secondary valley side. In each first column, the peak points along the peak row connect at each peak point, and the valley points along the valley row connect at each valley point. In each second column, the primary peak side of a peak row is connected to a secondary peak side of an adjacent peak row and each primary valley side of a valley row is connected to a secondary valley side of an adjacent valley row.

DETAILED DESCRIPTION OF THE INVENTION

Figure 1:
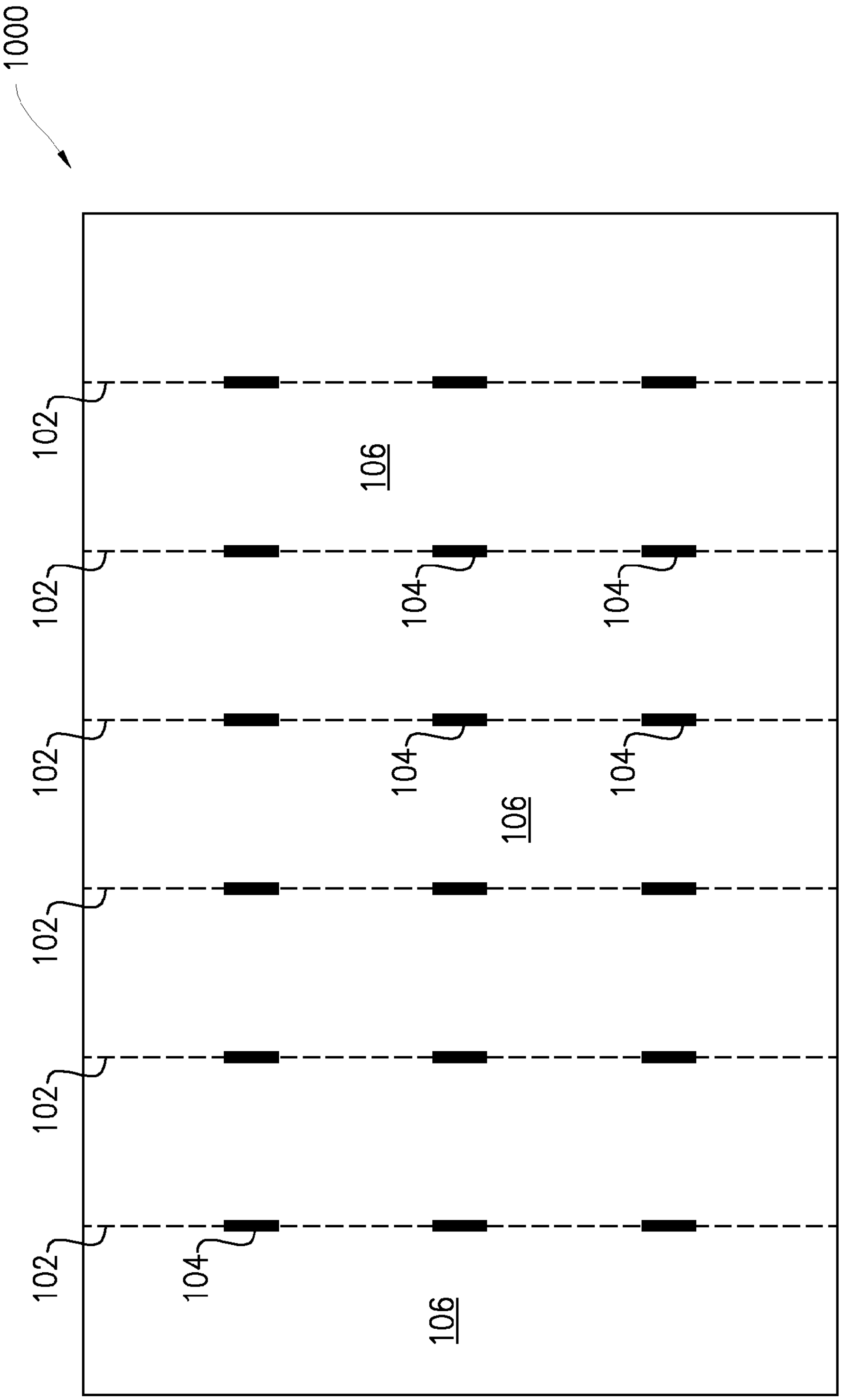
FIG. 1 is a side elevational view of a blank for a support article of the present invention, dashed lines represent fold lines, cut lines between the dashed lines define a split points.
Figure 3:
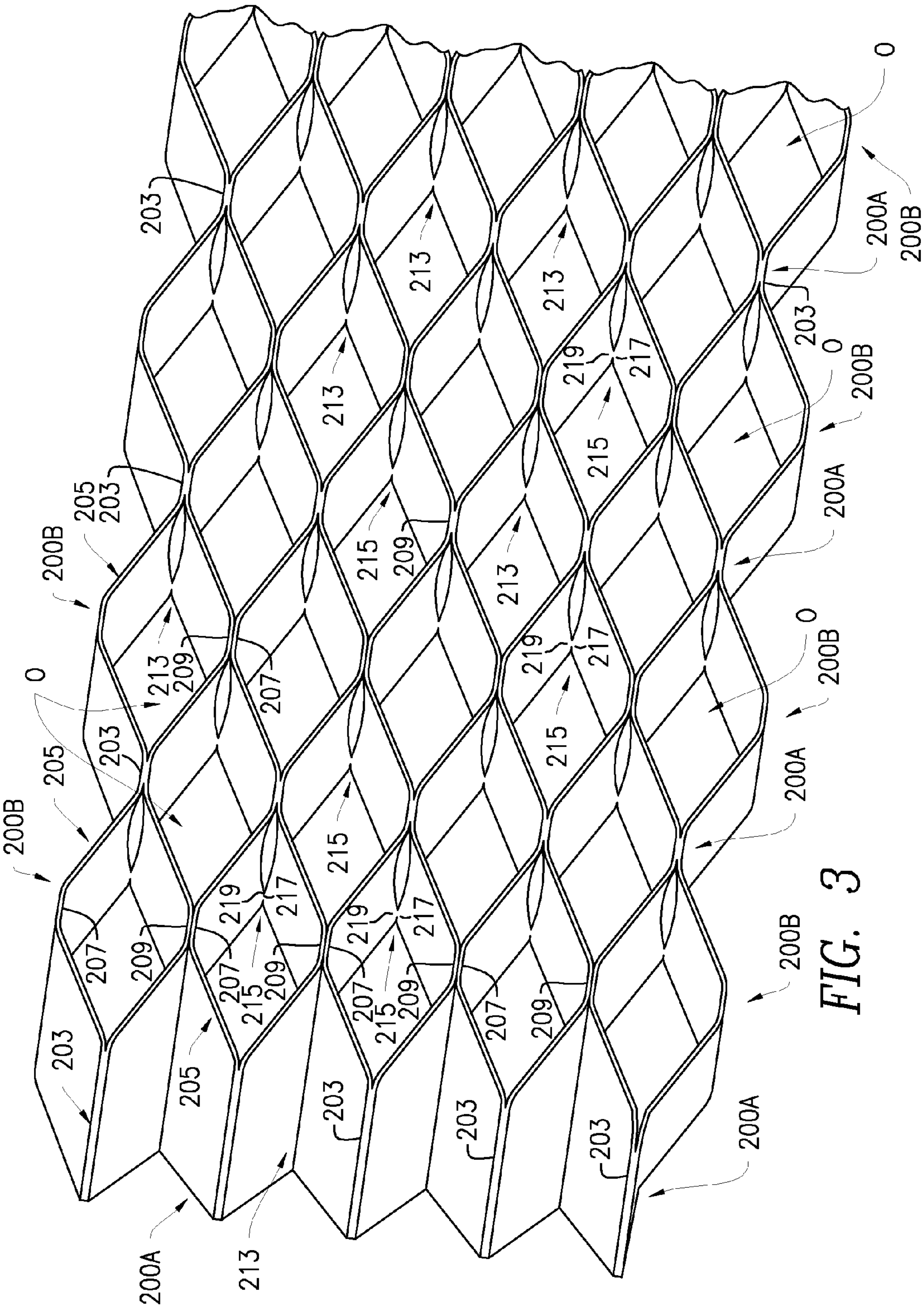
FIG. 3 is a perspective view of the support article of the present invention.

FIG. 1 shows a unitary blank or a single sheet of material 1000 that is used to create a basic support article 1100, see FIG. 3, the sheet 1000 is pliable as it is made of materials such as foams, plastics, chipboard, and other semi-rigid or still and flexible sheet materials. The blank 1000 has a series of fold lines 102 and cut lines disposed along the fold lines 102 where the cut lines 104 alternate with the fold lines 102. The blank 1000 is folded accordion style or pleated along the fold lines 102 to define panels 106. In one embodiment, the fold lines 102 are parallel resulting in the panels 106 being uniform and parallel.

The distance between the folds lines 102 can be adjusted. The distance between the fold lines 102 ultimately determines the size and strength of the support article 1100 that is produced using the sheet 1000. For instance, the larger the distance between the folds 102, the more support the support article 1100 can provide. The larger distances also create less transparency through voids or perforations O that are created in the support article 1100. See FIG. 3. With a shorter distance between the folds 102, the support article 1100 provides less support but increased transparency through the support article 1100. The distance between folds 102 may vary. In one non-limiting example the distance between the folds 102 is between two to four inches depending upon the type of material used to construct the support article and the overall thickness desired in the support article.

Figure 2:
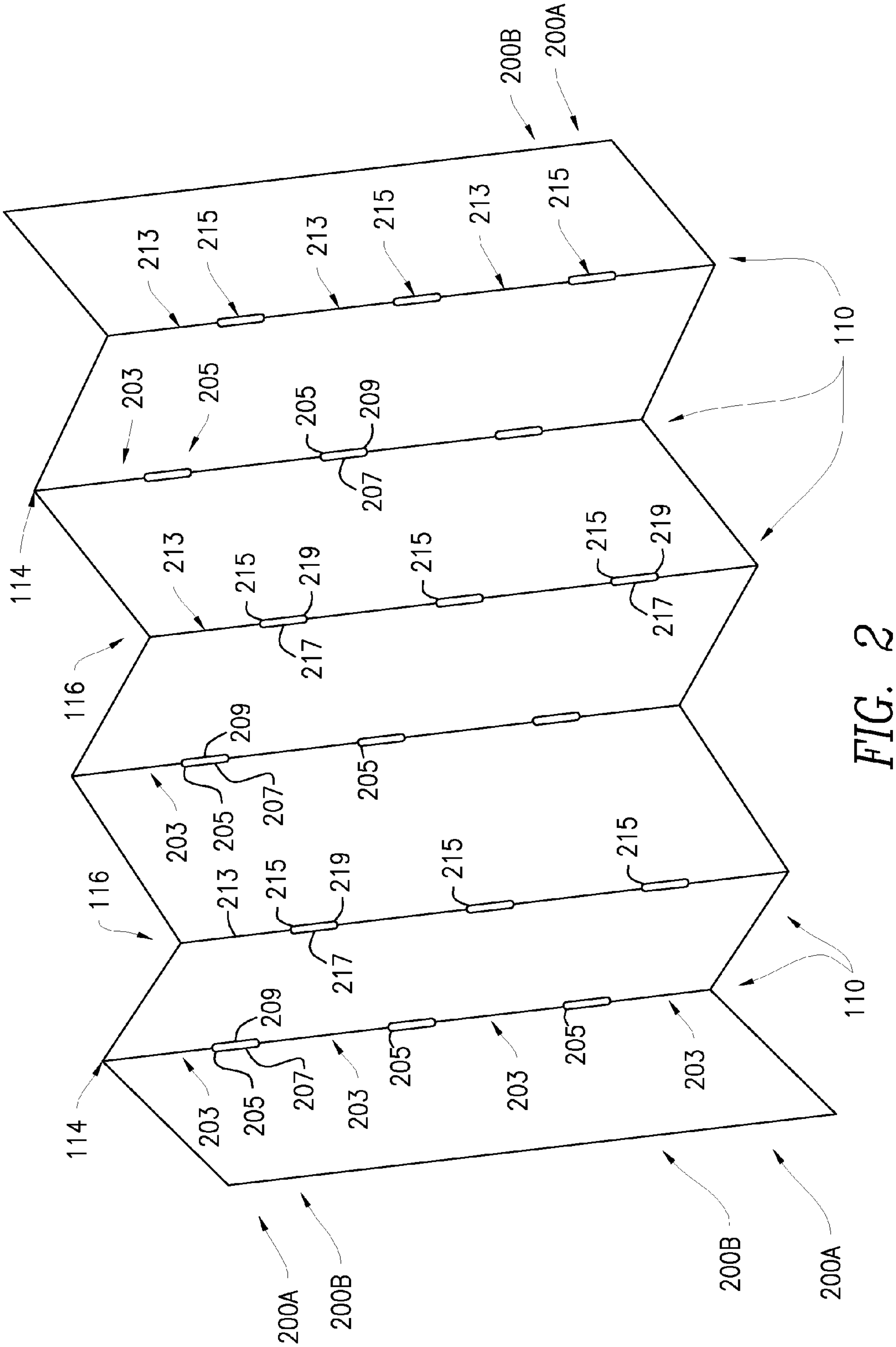
FIG. 2 is a perspective side elevational view of the blank as shown in FIG. 1, where rows of peaks and valleys are defined by folding along the fold lines.

Referring now to FIG. 2, the unitary blank 100 is folded along the fold line 102 to define rows 110 of peaks 114 and valleys 116. Each peak row 114 and valley row 116 has a plurality of first and second connection points. The first connection points are realized along the fold lines 102 and the second connection points are realized along the cut lines 104. The number of connection points determines the amount of voids and the distance between the connection points determine the perforation O in the support article 1100. Both determine the strength of the support article 1100. The connection points on the peak row 114 include a first peak point 203 which alternates with a second peak point 205. The connection points on the valley row 116 include a first valley point 213 which alternates with a second valley point 215. Each second peak point 205 and the second valley point 215 are positioned between two adjacent first peak points 203 and first valley points 213, respectively. Each of these second points can occur at the midpoint between its two adjacent first connection points for increased structural efficiency. The connections points are used to connect the sheet material 1000 to make the basic support article 1100 of the present invention. The closer the connection points are to each other, the more closed and structural the material becomes. The distance between the connection points can vary both within a basic unit and between different units or embodiments on the basic unit. In one non-limiting embodiment, the distance between the connection points are between four and twelve inches in another embodiment the spacing between first connection points and second connection points along the same fold line may be between two and six inches.

Columns are defined in the sheet material 1000 by the first and second connection points on the peaks and valleys. Each first peak point 203 and first valley point 213 are aligned to define a first column 200A and each second peak point 205 and second valley point 215 are aligned to define a second column 200B. The columns 200A and 200B are vertical in relationship to the horizontal rows 110. The columns 200A and 200B determine connection and cut points on the sheet material 1000. Like the rows 110, the columns 200A, 200B may be set at a range of distances. The further the columns 200A, 200B are apart, the larger will be voids or perforations O on the support article 1100 and the further the connection points 203, 205, 213, 215 are from one another. Inversely, the closer the columns 200A, 200B, the smaller the voids or perforations and the closer the connection points 203, 205, 213, 215. The support article 1100 once constructed becomes more rigid and less perforated the closer the connection points 203, 205, 213, 215 are to each other.

Still referring to FIG. 2, each the first peak point 203 and first valley point 213 as realized at the fold lines 102 are shown to be whole or unified while each the second peak point 205 and the second valley point 215 are cut or split into sides as said second points are realized along the cut lines 104. The second peak point 205 is cut to have a primary peak side 207 and a secondary peak side 209 and the second valley point 215 is cut to have a primary valley side 217 and a secondary valley side 219. It should be noted that the cut lines 104 at each second connection point is made along the fold line 102 of each peak and valley rows without affecting the whole, united or uncut fold line 102 which is segregated for defining each first connection point. The cuts lines 104 for each second connection point 205 and 215 define the voids or perforations in the support article 1100 once it is formed thereby allowing airflow and visibility through the support article.

As mentioned above, the first points 203, 213 and the second points 205, 215 are connected to define the support article 1100 of the present invention. See FIG. 2 in conjunction with FIG. 3. Each first peak point 203 is connected along the fold line of its peak row and each first valley point 213 is connected along the fold line of its valley row. In contrast, the second peak points 205 and the second valley points 215 are selectively connected to neighboring rows 110 by connecting a primary side of one peak or valley row to a secondary side of an adjacent second peak or valley row, respectively. Alternatively, it can be said that the outside surfaces at the second connection points 205, 215 of one surface is affixed to the outside surface of an adjacent second connection point. For instance, the primary peak side 207 of one peak row 114 is connected to the secondary peak side 209 of a neighboring or adjacent peak row 114. Likewise, the primary valley side 217 of one valley row 116 is connected to the secondary valley side 219 of a neighboring or adjacent valley row 116. In one embodiment, the creation of the support article 1100 can be realized after cuts are made at the second connection points and the sheet material is folded back into the accordion fold so that the primary 207, 217 and secondary sides 209, 219 at the second connection points are affixed to adjacent secondary and primary sides, respectively. And each point 203 and 213 are connected along their peak and valley rows, respectively.

It should be noted that the spacing between the connection points in the sheet material 1000 can adjust the voids or perforations O as well as the structural properties of the structural unit 1100. Such an adjustment occurs when the spacing between the column 200A, 200B is adjusted across the sheet material 1000 to vary the spacing between the connection points 203 and 205 and between 213 and 215. This process of varying the columns is known as parametric spacing which occurs where when one or more variable(s) changes (thickness of the material, spacing between the fold lines, spacing of the connection points, column spacing) at one point, the other points adjust accordingly. A simple example would pertain to spacing between two objects. If the distance between four points were two inches, and we changed the distance between the third and fourth points to one inch, a parametric model would change the distance between the second and third points to one and a half inches and keep the distance between the first and second points at two inches. Computer programs on computer hardware may be used to set up a series of relationships between the connection points and the fold lines. One non-limiting example of a computer program useful in parametric spacing is Maya®. Because a variable or variables may change at a single point and affect the adjacent points, the relationships between the columns and fold lines might not necessarily remain perpendicular. Likewise, the fold lines 110 may not necessarily remain parallel.

The above described method of creating the support article 1100 results in a semi-permeable support article that allows airflow, ventilation, and visibility therethrough. The voids or perforations O defined in the support article 1100 can be controlled with variables inherent in the design. The method of the present invention also produces a support article 1100 that is collapsible to a fraction of its original size and easily compresses and expands along its fold lines.

When the unitary blank or sheet material 1000 is assembled it defines a support article 1100. The connections at the first points 203, 213 and the second points 205, 215 define a bi-directional corrugated structure of the support article 1100 defined by the voids or perforations O and connection points 203, 205, 213, 215. The length and width of the support article 1100 are determined by the sizes available for the sheet material 1000. The thickness of the support article 1100 is determined by spacing between the fold lines 102 of the accordion folds. The further the spacing between the folds 102 the thicker will be the support article 1100. As the support article 1100 gets thicker, a third series of connection points may be added at the midpoint between the connection points at the peak rows and the valley rows to add support to the support article. As mentioned above, the thickness, permeability, and connection points are able to be varied across the support article 1100. There are several variations to the folds 102 for instance in one embodiment, the manipulation of fold lines 102 or the introduction of additional fold lines 102 will add curvature and contouring to the support article 1100.

Figure 4:
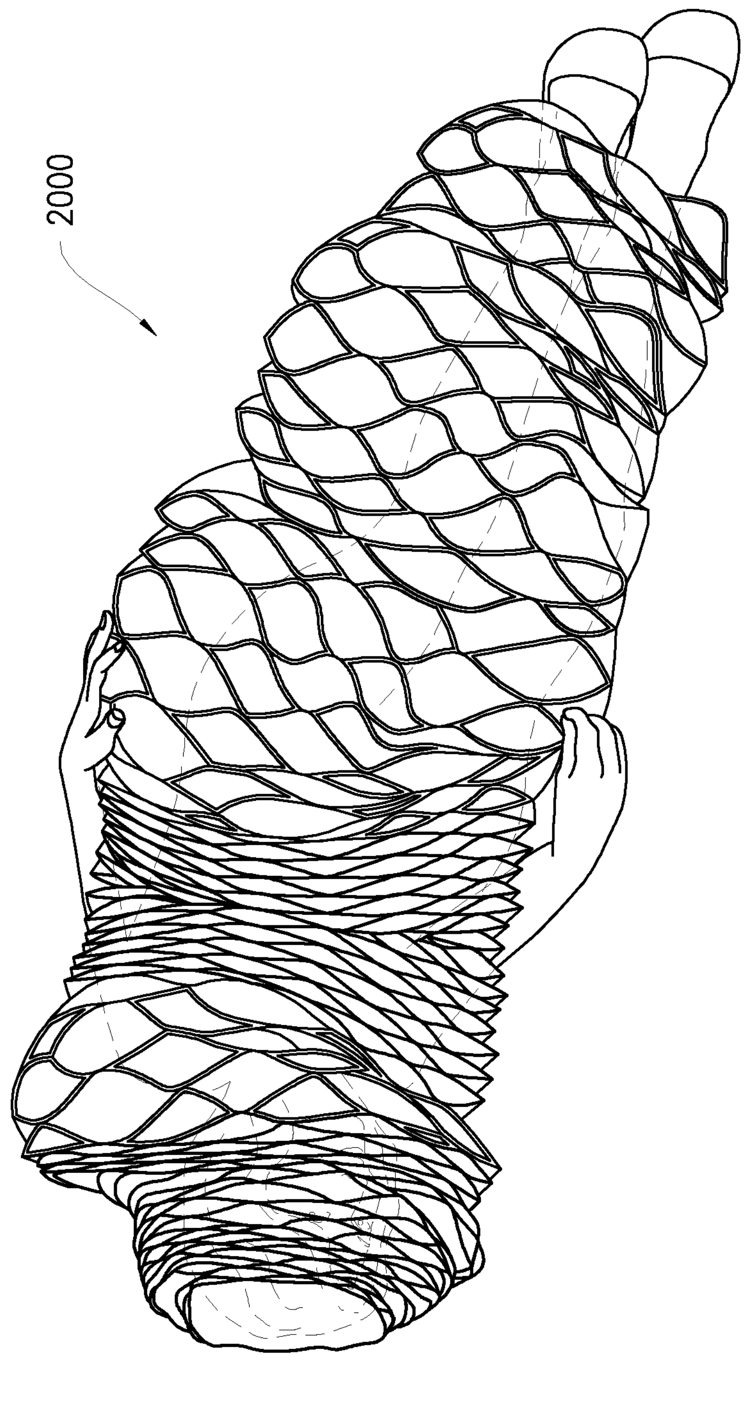
FIG. 4 shows a plurality of support articles joined together to define a sleep suit.

The support article 1100 may be used for a variety of purposes. In one embodiment the support article 1100 may be used for packing materials or supporting articles such as a travel pillow, a flat mattress, etc. In another embodiment, a plurality of support articles 1100 may be attached together to create larger pieces of material. For instance, in one embodiment a plurality of support article 1100 are assembled to create a Sleep Suit™ 2000 as shown in FIG. 4.

While the present invention has been described in conjunction with specific embodiments, those of normal skill in the art will appreciate the modifications and variations can be made without departing from the scope and the spirit of the present invention. For instance, though the support article 1100 has been described above by using a sheet material, said articles could also be made using strips of material. Such modifications and variations are envisioned to be within the scope of the appended claims.

The invention claimed is:

1. A method of making a_support article_comprising:

accordion folding a single unitary sheet of material;

defining rows of peaks and rows of valleys in said single unitary sheet, wherein the peak rows are parallel to the valley rows;

defining alternating first peak points and second peak points along each peak row;

defining alternating first valley points and second valley points along each valley row;

defining first columns and second columns, the first columns comprising the first peak points on each said peak row and the first valley points on each said valley row and the second columns comprising the second peak points on each said peak row and the second valley points on each said valley row, each said first column being parallel to each said second column, each said first column and each said second column being perpendicular to the peak rows and the valley rows;

selectively connecting said second peak point on a peak row of said single unitary sheet with said second peak point on an adjacent peak row of said single unitary sheet; and selectively connecting said second valley point on a valley row of said single unitary sheet with a second valley point on an adjacent valley row of said single unitary sheet.

2. The method of claim 1, wherein each said second peak point is split into a primary peak side and a secondary peak side and, wherein each said second valley point is split into a primary valley side and a secondary valley side.

3. The method of claim 2, wherein each said primary peak side of said peak row is connected to said secondary peak side of said adjacent peak row.

4. The method of claim 2, wherein said primary valley side of said valley row is connected to said secondary valley side of said adjacent valley row.

5. The method of claim 1, wherein said rows of said peaks alternate with said rows of said valleys.

6. The method of claim 1, wherein said rows of said peaks are at a distance between about 2 to 4 inches from said rows of said valleys.

7. The method of claim 1, wherein said rows of said peaks are parallel, wherein said rows of said valleys are parallel.

8. The method of claim 1, wherein said first columns include said first peak points aligned with said first valley points;

said second columns including second peak points aligned with said second valley points; and connecting said first peak points.

9. The method of claim 8, wherein said first columns alternate with said second columns and said first columns are at a distance between about 4 and 12 inches from said second columns.

* * * * *